H. HINES.
SPRING WHEEL.
APPLICATION FILED OCT. 6, 1917.

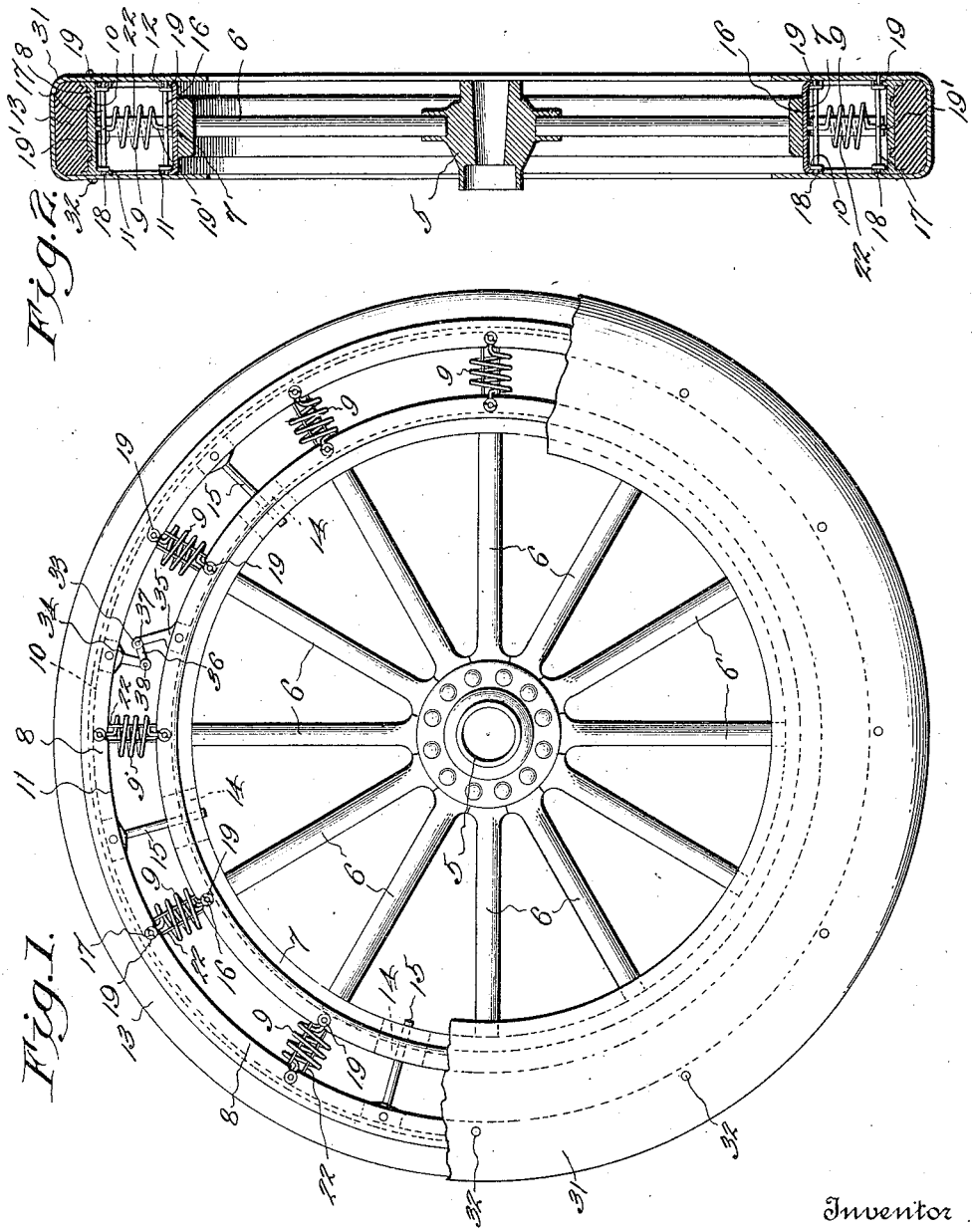

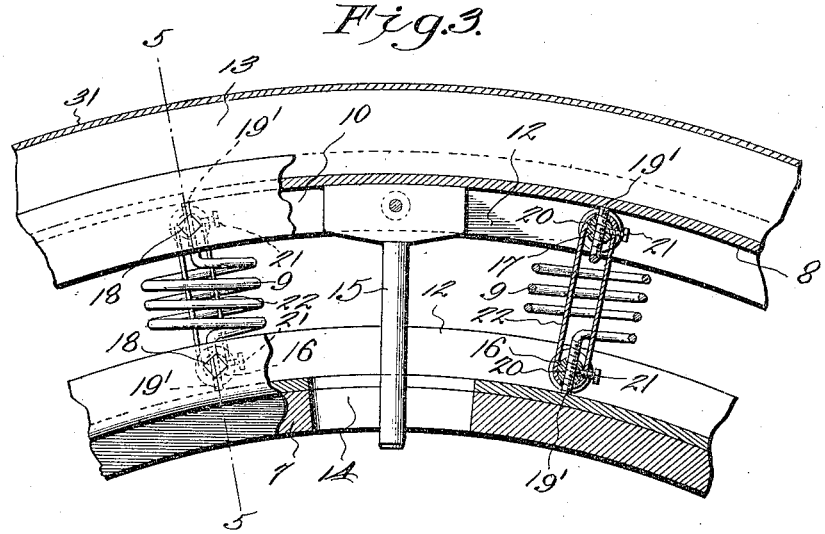
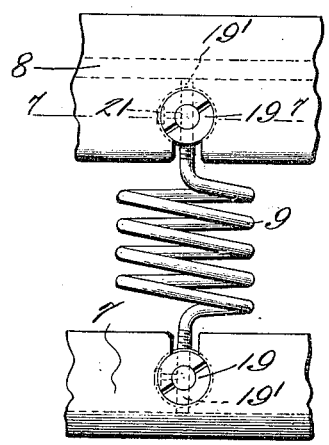
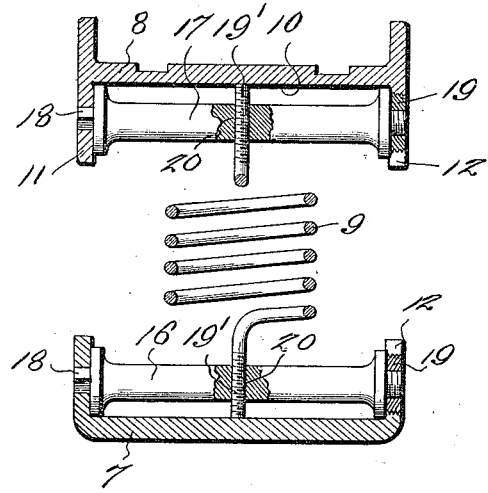

1,295,316.

Patented Feb. 25, 1919.
3 SHEETS—SHEET 3.

Inventor
Harry Hines,
By Victor J. Evans
Attorney

Witnesses

UNITED STATES PATENT OFFICE.

HARRY HINES, OF LANCASTER, SOUTH CAROLINA.

SPRING-WHEEL.

1,295,316.   Specification of Letters Patent.   Patented Feb. 25, 1919.

Application filed October 6, 1917. Serial No. 195,185.

*To all whom it may concern:*

Be it known that I, HARRY HINES, a citizen of the United States, residing at Lancaster, in the county of Lancaster and State of South Carolina, have invented new and useful Improvements in Spring-Wheels, of which the following is a specification.

This invention relates to spring vehicle wheels and it consists in the novel features hereinafter described and claimed.

An object of the invention is to provide a structure of a simple and durable nature adapted to connect the rim with the felly of a wheel in a manner whereby the rim may have movement with relation to the felly, there being interposed between the rim and felly springs adapted to hold the said parts at normal position with relation to each other.

In the accompanying drawings—

Figure 6:
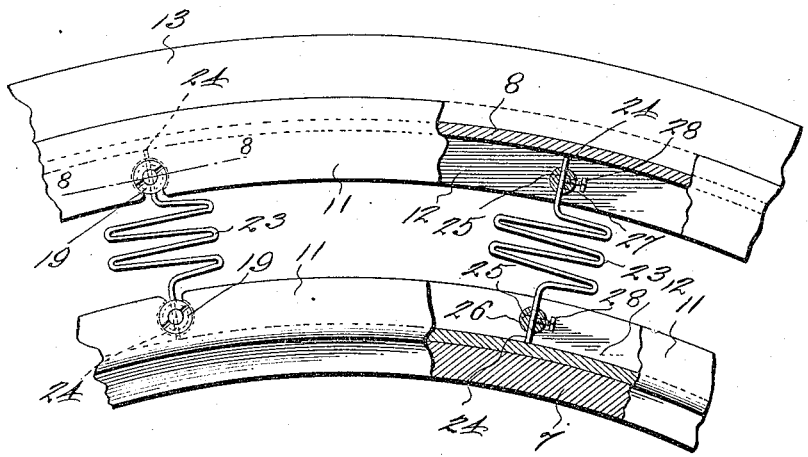
Figure 7:
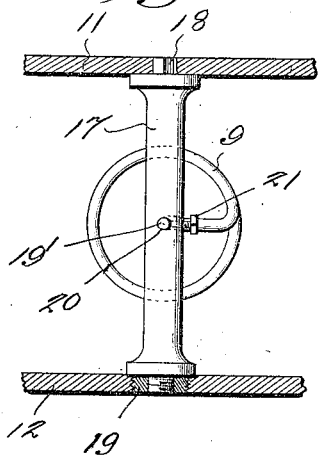
Figure 8:
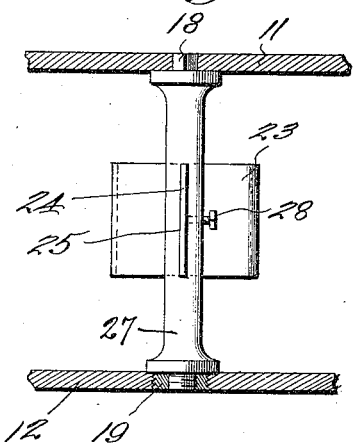

Figure 1 is a side elevation of the wheel with a portion of the cover thereof broken away, Fig. 2 is a transverse sectional view of the same, Fig. 3 is a fragmentary sectional view of the same on an enlarged scale with parts broken away, Fig. 4 is a detailed side elevation of one of the springs of the wheel and adjacent parts, Fig. 5 is an enlarged transverse sectional view of a portion of the wheel cut on the line 5—5 of Fig. 3, Fig. 6 is a fragmentary side elevation of a modified form of the invention with parts broken away, Fig. 7 is a plan view of the spring as shown in Fig. 4, and Fig. 8 is a plan view of the form of spring as shown in Fig. 6.

Referring more particularly to the drawings, the numeral 5 denotes the hub of a wheel, and 6 the spokes for connecting the felly 7 to the hub. The outer rim 8 is resiliently connected with the felly 7 by means of springs 9 which when the wheel strikes an obstruction will contract whereby the rim may move with relation to the felly. Consequently the said springs 9 will absorb the shocks and the jolts which would otherwise be communicated to the felly of the wheel. The felly and rim are channeled as at 10 and the said channels are bounded by flanges 11 and 12. A tire 13 is seated on the periphery of the rim and the felly is provided with spaced slots 14 which receive pins 15 depending from and carried by the rim 8. Bolts 16 and 17 are detachably connected with the flanges of the felly and rim respectively. The said bolts are provided at one end with squared portions 18 which are inserted in the flanges 11 and at their other ends with nuts 19 engaging the flanges 12. The end portions of the springs 9 are threaded as at 19′ and the said threaded portions pass through openings 20 in the bolts 16 and 17 and are secured therein by means of set screws 21 which pass through the sides of the said bolts. In the form of the invention as shown in Figs. 1, 2 and 3, resilient loops 22 pass through the springs 9 and pass around the bolts 16 and 17. These loops 22 add to the resiliency of the wheel structure and serve to assist the springs in holding the rim in normal position with relation to the felly.

In the form of the invention illustrated in Figs. 6 and 8, the springs 23 are formed from flat material and they are provided with end portions 24 which pass through openings 25 in bolts 26 and 27 which are similar to the bolts 16 and 17 hereinbefore described. The portions 24 are secured in the bolts 26 and 27 by means of set screws 28. A casing 31 is connected with the rim 8 by means of securing devices 32 and is adapted to overlap the felly. Means indicated at 33 are provided for preventing the rim from creeping with relation to the felly, the said means including a lug 34 depending from the rim and a second lug 35 carried by the felly. The ends of the said lugs are connected together by means of a link 36 pivotally connected with the lugs at points 37 and 38.

What is claimed as new, is:—

A wheel having a felly, a rim surrounding the felly, bolts attached, some to the felly and others to the rim, springs located between the corresponding bolts upon the felly and rim and having end portions which pass transversely through the said bolts, the opposite ends of the spring bearing against the felly and rim respectively and means carried by the bolts for fixing the end portions of the springs to the bolts.

In testimony whereof I affix my signature.

HARRY HINES.

Copies of this patent may be obtained for five cents each, by addressing the "Commissioner of Patents, Washington, D. C."